United States Patent
Landvik et al.

(10) Patent No.: US 12,437,589 B2
(45) Date of Patent: Oct. 7, 2025

(54) USE OF ACOUSTIC VEHICLE ALERTING SYSTEMS FOR BATTERY POWERED HEAVY-DUTY VEHICLES

(71) Applicant: VOLVO TRUCK CORPORATION, Gothenburg (SE)

(72) Inventors: Sondre Landvik, Gothenburg (SE); Sebastien Ragot, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 505 days.

(21) Appl. No.: 17/733,353

(22) Filed: Apr. 29, 2022

(65) Prior Publication Data
US 2022/0398881 A1   Dec. 15, 2022

(30) Foreign Application Priority Data
Jun. 14, 2021   (EP) .................................... 21179292

(51) Int. Cl.
G07C 5/08   (2006.01)
B60L 3/12   (2006.01)
B60L 58/12   (2019.01)
B60R 16/03   (2006.01)

(52) U.S. Cl.
CPC .............. G07C 5/0833 (2013.01); B60L 3/12 (2013.01); B60L 58/12 (2019.02); *B60L 2200/28* (2013.01); *B60R 16/03* (2013.01)

(58) Field of Classification Search
CPC ......... G07C 5/0833; B60L 3/12; B60L 58/12; B60L 2200/28; B60L 3/0046; B60R 16/03; B60R 25/104; Y02T 10/70; B60Q 5/006; B60Q 5/008
See application file for complete search history.

(56) References Cited

U.S. PATENT DOCUMENTS

| | | | |
|---|---|---|---|
| 10,482,687 B2 * | 11/2019 | Miller | H04R 29/002 |
| 2015/0054642 A1 * | 2/2015 | Carruthers | B60Q 5/008 |
| | | | 340/463 |
| 2017/0222612 A1 | 8/2017 | Zollner | |

(Continued)

FOREIGN PATENT DOCUMENTS

| | | | | |
|---|---|---|---|---|
| DE | 202019005564 U1 | 2/2021 | | |
| EP | 3300966 A1 * | 4/2018 | | B60Q 5/005 |

(Continued)

OTHER PUBLICATIONS

European Search Report in corresponding European Application No. 21179292.4 dated Dec. 7, 2021 (10 pages).

*Primary Examiner* — Peter D Nolan
*Assistant Examiner* — Demetra R Smith-Stewart
(74) *Attorney, Agent, or Firm* — Venable LLP; Jeffri A. Kaminski

(57) ABSTRACT

A vehicle control unit for an electrically powered vehicle unit, the vehicle control unit comprising at least one input port arranged to receive data associated with a status of one or more electrical system components, the vehicle control unit comprising an output port arranged to trigger a warning signal by an acoustic vehicle alerting system, AVAS, wherein the vehicle control unit is arranged to detect onset of an electrical system fault condition based on the received data, and to trigger a warning signal by the AVAS in case an electrical system fault condition is detected.

16 Claims, 2 Drawing Sheets

(56) References Cited

U.S. PATENT DOCUMENTS

| | | |
|---|---|---|
| 2019/0135126 A1 | 5/2019 | Schmitt et al. |
| 2019/0359018 A1 * | 11/2019 | Brickley ................. B60D 1/26 |
| 2020/0307639 A1 | 10/2020 | Tsuji et al. |
| 2021/0082395 A1 | 3/2021 | Albl |

FOREIGN PATENT DOCUMENTS

| | | | |
|---|---|---|---|
| EP | 3300966 B1 | 11/2020 | |
| GB | 2584293 A | 12/2020 | |
| WO | WO-2012059285 A1 * | 6/2012 | ............. B60Q 5/008 |

\* cited by examiner

USE OF ACOUSTIC VEHICLE ALERTING SYSTEMS FOR BATTERY POWERED HEAVY-DUTY VEHICLES

TECHNICAL FIELD

The present disclosure relates primarily to electrically powered heavy-duty vehicles, such as electric or hybrid-electric trucks and semi-trailer vehicles, although the techniques disclosed herein can also be used in other types of vehicles. The disclosure relates in particular to acoustic vehicle alerting systems (AVAS).

BACKGROUND

Electric and hybrid-electric vehicles comprise battery packs which may represent a hazard to emergency personnel arriving at the site of an accident involving the electric or hybrid-electric vehicle. A problem is that the emergency personnel arriving at the site will have difficulty in determining the status of the electric system without manually inspecting the system. A manual inspection could be hazardous, e.g., in case a thermal runaway event is in progress since it often requires the person performing the inspection to be located close to the vehicle. It is also difficult for first-responders to determine if the traction voltage system is active or not, if the batteries have been damaged or not, and if there are any other dangerous unknowns.

Helping the rescue services with additional information at the site of an accident or in an emergency situation could significantly improve the safety of the first-responders and also any other persons located in vicinity of the vehicle.

EP3300966B1 discloses a vehicle equipped with an acoustic vehicle alerting system (AVAS), where the AVAS is arranged to output a fictitious sound when the vehicle is driving at low speeds. The AVAS system is also arranged for one or more secondary purposes in addition to outputting the low-speed fictious sound.

US2020307639, US2017222612, and US2021082395 also relate to the use of AVAS in battery powered vehicles.

However, despite the developments to-date, there is a need for further improvements in safety mechanisms for electric and hybrid-electric vehicles.

SUMMARY

It is an object of the present disclosure to provide safety mechanisms suitable for electrically powered heavy-duty vehicles. This object is at least in part obtained by a vehicle control unit for an electrically powered vehicle unit. The vehicle control unit comprises at least one input port arranged to receive data associated with a status of one or more electrical system components and an output port arranged to trigger a warning signal by an acoustic vehicle alerting system (AVAS). The vehicle control unit is arranged to detect onset of an electrical system fault condition based on the received data, and to trigger a warning signal by the AVAS in case an electrical system fault condition is detected.

Thus, persons in vicinity of the electrically powered vehicle unit, such as first-responders, may receive information about the vehicle via the AVAS, as an acoustic signal, comprising, e.g., a voice information message, and/or an audible warning signal. The AVAS system is already present in many electrically powered heavy-duty vehicles, and may be re-used for this purpose, which is an advantage. According to aspects, According to aspects, the received data comprises thermal data associated with a thermal status of an electrical system component, where the warning signal by the AVAS comprises a thermal event warning signal.

Thermal events may be hazardous to persons in vicinity of the vehicle. This way the persons may become aware of the danger, and take appropriate action, such as to vacate the area, or cool down the battery system of the vehicle.

According to aspects, the received data comprises current measurement data associated with an operation of an electrical system component, where the warning signal by the AVAS comprises an electrical current warning signal. This means that a person in vicinity of the vehicle may receive a warning message informing about a live wire on the vehicle, i.e., that the vehicle power has not been cut. The received data may also comprise voltage measurement data associated with an operation of an electrical system component, where the warning signal by the AVAS comprises an electrical voltage warning signal.

According to aspects, the vehicle control unit is arranged to detect onset of the electrical system fault condition and trigger the warning signal in response to an external control signal. This means that a first responder or the like can trigger the information system of the vehicle on demand. For instance, a person arriving at the scene of an accident may trigger the system and thus receive valuable information about the vehicle status, before taking any actions which could potentially be dangerous.

The vehicle control unit may further be arranged to receive data associated with a status of an airbag system, wherein the vehicle control unit is arranged to trigger a warning signal by the AVAS in case the airbag has been activated. An activated airbag is indicative of that the vehicle has had an accident. Thus, the warning system may inform passers by that an accident has occurred, and that the vehicle may be dangerous to approach, e.g., due to the possibility of a thermal event or the like.

The vehicle control unit may furthermore be arranged to receive data associated with a load on one or more vehicle axles, and to trigger an information signal by the AVAS in case the load exceeds a pre-determined load threshold. This way the system can also be used to assist in loading the vehicle. Thus, the AVAS systems disclosed herein may have one or more further uses apart from acting as a safety system.

The vehicle control unit may also be arranged to receive data associated with a state of charge (SOC) of a battery system, and to trigger an information signal by the AVAS in case the SOC exceeds a pre-determined SOC threshold. This is a convenience function which can be used to inform, e.g., an operator outside of the vehicle that the SOC has reached a pre-determined level, and that, e.g., the vehicle may be taken from a charging station.

There are also disclosed warning systems comprising a vehicle control unit as discussed above, and an AVAS connected to the vehicle control unit via the output port. This warning system optionally comprises a redundant energy source arranged to at least temporarily power the AVAS. The redundant energy source ensures that the warning system remains operational despite loosing power connection to the vehicle main electrical system. The warning system optionally also comprises a redundant control unit with memory arranged to at least temporarily control the AVAS in case the connection between the AVAS and the vehicle control unit discussed above is lost.

There is also disclosed herein methods, vehicle units, and computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
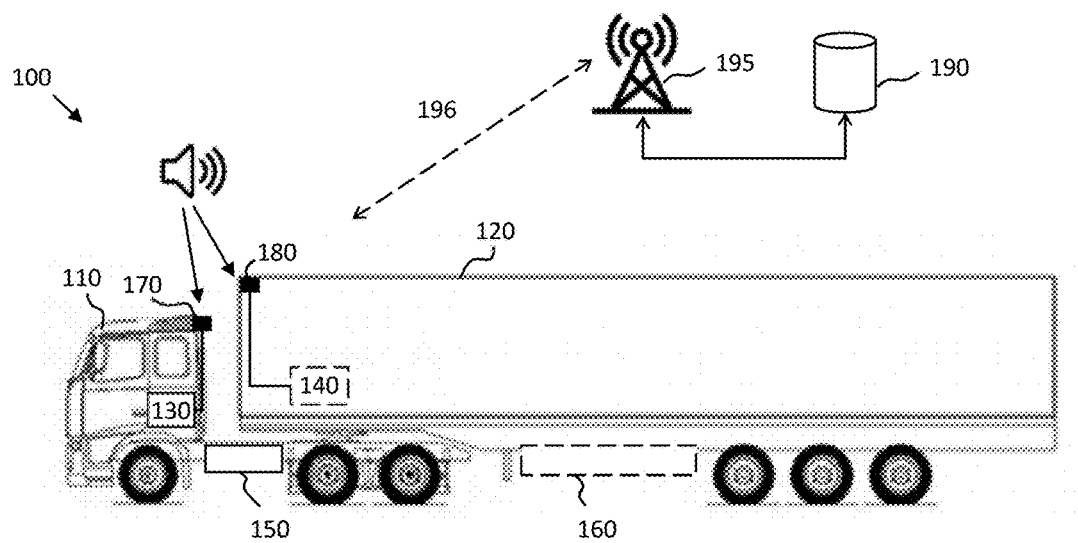
FIG. 1 schematically illustrates an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a truck or towing vehicle 110 configured to tow a trailer unit 120 in a known manner. The example tractor 110 in FIG. 1 comprises a vehicle control unit (VCU) 130 configured to perform various vehicle control functions. The trailer unit 120 may optionally also comprise a VCU 140. The vehicle 100 is optionally connected via wireless link 196 to a remote server 190. The techniques disclosed herein may be performed by any of the control units 130, 140, by the remote server 190, or by a combination of one or more control units.

The vehicle 100 is at least partly electrically powered, and therefore comprises electrical energy storage systems 150, 160. It is noted that the trailer may be electrically powered even if the tractor is powered by a combustion engine.

Acoustic vehicle alerting systems (AVAS) are system arranged to generate sounds designed to alert pedestrians to the presence of electric drive vehicles such as hybrid electric vehicles (HEVs), plug-in hybrid electric vehicles (PHEVs), and all-electric vehicles (EVs) travelling at low speeds. Warning sound devices were deemed necessary by some government regulators because vehicles operating in all-electric mode produce less noise than traditional combustion engine vehicles and can make it more difficult for pedestrians and cyclists (especially the blind or short-sighted) to be aware of their presence. Warning sounds may be driver triggered (as in a horn but less urgent) or automatic at low speeds; in type, they vary from clearly artificial (beeps, chimes) to those that mimic engine sounds and those of tires moving over gravel.

The vehicle 100 comprises at least one AVAS 170, 180. The tractor unit 110 may comprise one AVAS, and the trailer unit may comprise another AVAS 180. Either of the AVAS 170, 180 can of course also be used to serve both vehicle units, in which case one VCU controls more than one AVAS.

The present disclosure relates to the use of an AVAS for one or more secondary purposes in addition to alerting pedestrians to the presence of an electric drive vehicle. The proposed warning system uses the AVAS speakers as output, and communicates with the other systems of the vehicle to select the correct message for the correct situation. This can be done by for example by using the airbag sensor to detect that a severe collision has occurred where the airbags have been activated. The battery pack monitoring system (BMS) on the vehicle can be used to understand if the batteries have been damaged in an accident, if a failure has occurred, if a thermal event is in progress etc.

Further examples of the secondary uses for an existing AVAS system comprise, e.g., weight measurement systems on axles can be used to note if the maximum payload has been reached during loading, in which case the AVAS can be used to inform an operator about the fact.

Some examples of messages which can be dispatched via the AVAS as voice messages comprise:

Burglar Alarm:
 *siren* "theft in progress" *siren*
Fire Alarm:
 *siren* "Thermal event in progress" *siren*
In Case of Accident:
 "Warning! Battery pack no. 4 is overheating, evacuate area"
 "Warning! Battery cell error detected in battery pack 2, right hand side."
 "Warning! Thermal runaway in progress in battery 3"
 "Emergency shut-off button located behind cab on right hand side"
 "High voltage disconnect switch located behind cab on right hand side"
 "Warning! Dangerous (explosive/flammable/toxic/corrosive) cargo on-board vehicle"
 "Warning! This vehicle contains hydrogen under high pressure."
Information to Surroundings:
 "Maximum load achieved"
 "This is a battery electric vehicle. Do not touch. High voltage system is active"
 "Warning—traction system voltage is active"
 "Refueling completed"
 "Gas filling completed. Tank pressure is now 700 bars"

All of the above example AVAS-generated messages may of course be repeated at regular intervals, or continuously. The AVAS message may also be triggered when a proximity sensor detects a person nearby the vehicle, or in response to an external trigger signal, such as a trigger signal received from a remote control handled by a first responder, or a trigger signal received from the remote server 190 via the ireless link 196.

Figure 2:
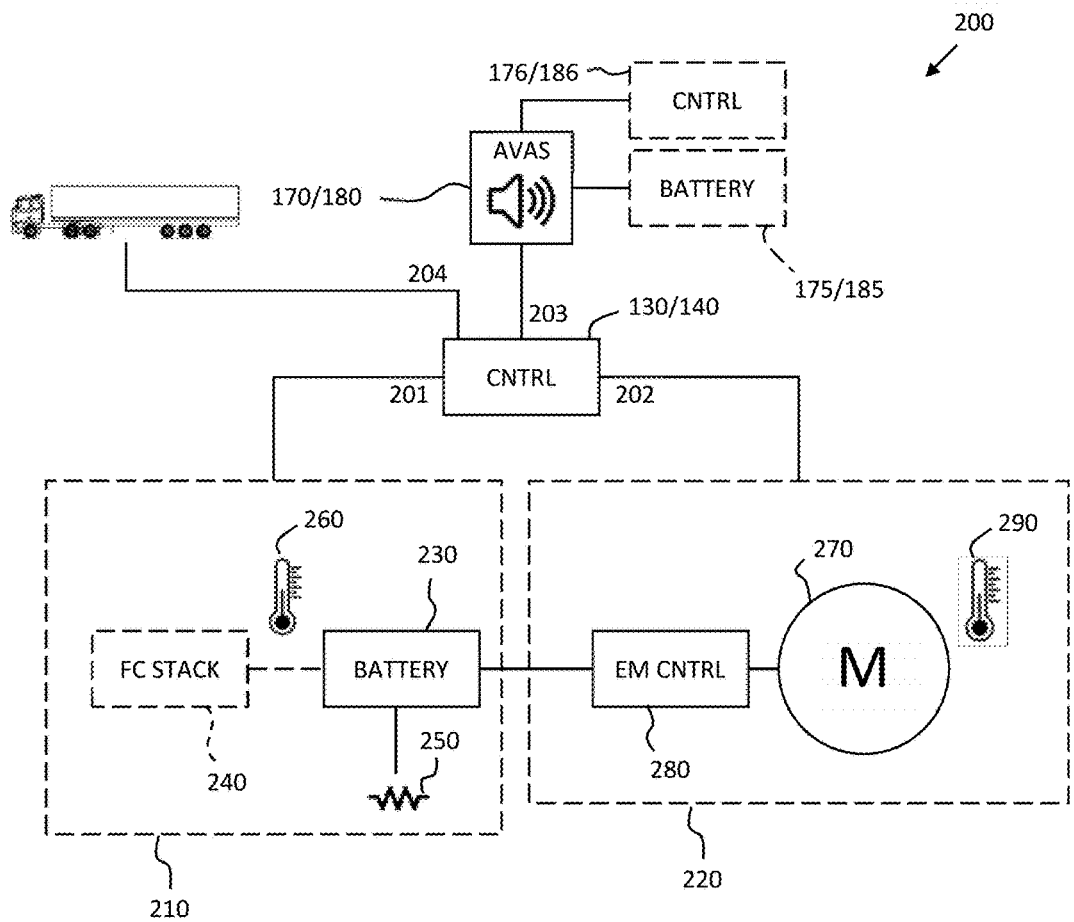
FIG. 2 shows a vehicle control system.

FIG. 2 illustrates a control system 200 comprising a control unit 130, 140 (which could be any of the tractor and/or trailer VCUs). The control unit comprises at least one input port 201, 202. In this example there are two input ports shows, where a first input port 201 connects the control unit to an electrical energy storage (ESS) subsystem 210, and where a second input port 202 connects the control unit to a propulsion sub-system 220. It is appreciated that the input ports and the output ports of the control unit may very well be based on a shared bus communication, such as a controller area network (CAN) bus or the like.

The control unit 130, 140 is connected to an AVAS 170, 180. This AVAS may optionally be connected to its own redundant power source 175, 185, which can be used to at least temporarily power the AVAS in case of power outage in the vehicle unit 110, 120. The AVAS may also comprise an optional back-up control unit 176/186 which may, e.g., be configured to keep generating a warning message even if the connection to the VCU 130, 140 is lost for some reason.

The control unit 130, 140 is optionally connected to other sensors and control units on the vehicle unit, i.e., the control unit may also comprise an input port 204 for receiving general status information and messages related to various operations on one or more vehicle units 110, 120. These sensors and systems are only schematically illustrated in FIG. 2.

The ESS sub-system 210 comprises one or more battery packs 230 and optionally also one or more fuel cell stacks 240. A break resistance 250 may also be provided in order to dissipate excess energy which the battery cannot accommodate. One or more temperature sensors 260 are arranged in connection to the ESS subsystem 210, in order to monitor temperatures of the different components. Thus, the control unit 130, 140 may receive information related to the temperature of the different electrical components on the vehicle unit via the input port 201.

The propulsion sub-system 220 may comprise an electric machine (EM) controller 280, one or more EMs 270, and also temperature sensors configured to monitor temperatures at various places in the propulsion subsystem 220. Thus, the control unit 130, 140 may receive temperature data also from the propulsion subsystem 220, via the second input port 202.

To summarize, FIG. 2 schematically illustrates a vehicle control unit 130, 140 for an electrically powered vehicle unit 110, 120. The vehicle control unit 130, 140 comprises at least one input port 201, 202 arranged to receive data associated with a status of one or more electrical system components 150, 160, 210, 220. The vehicle control unit 130, 140 also comprises an output port 203 arranged to trigger a warning signal by an acoustic vehicle alerting system (AVAS) 170, 180 arranged on one or both of the vehicle units 110, 120 of the heavy-duty vehicle 100. The VCU 130, 140 is arranged to detect onset of an electrical system fault condition based on the received data, and to trigger a warning signal by the AVAS 170, 180 in case an electrical system fault condition is detected.

This means that, e.g., first responders arriving at the site of an accident will encounter a vehicle which informs its surroundings about its status, and any potential hazards which the first responders and any other persons located in vicinity of the vehicle should be aware of.

The received data, i.e., the data input to the control unit from the various sensors on the different vehicle units, may comprise thermal data associated with a thermal status 260, 290 of an electrical system component 210, 220. The warning signals generated by the AVAS 170, 180 may then comprise a thermal event warning signal. For instance, the ESS subsystem 210 may be experiencing a thermal runaway event, which could represent a substantial risk to a person coming too close. The triggered warning signals may, e.g., comprise a speaker voice repeatedly warning persons in the surroundings, such as:

"Warning! Battery pack no. 4 is overheating, evacuate area" (repeated),

"Warning! Battery cell error detected in battery pack 2, right hand side" (repeated), "Warning! Thermal runaway in progress in battery 3" (repeated).

The received data may also comprise current measurement data associated with an operation of an electrical system component 210, 220. In this case the warning signal by the AVAS 170, 180 comprises an electrical current warning signal. A first responder then becomes aware of the active electrical system where current is still flowing. The first responder may then take proper precautionary measures in order to not be electrocuted by a live wire. The received data may of course also comprise voltage measurement data associated with an operation of an electrical system component 210, 220, where the warning signal by the AVAS 170, 180 comprises an electrical voltage warning signal.

The vehicle control unit 130, 140 is optionally also arranged to detect onset of the electrical system fault condition and trigger the warning signal in response to an external control signal. This means that an external party, such as a first responder, may trigger the AVAS system to report vehicle status. For instance, a first responder may carry a wireless transceiver which is configured to remotely trigger a report by the AVAS, thereby informing the first responder about any potential hazards which can be expected if coming close to the vehicle.

According to other aspects, the vehicle control unit 130, 140 is arranged to receive data associated with a status of an airbag system, wherein the vehicle control unit 130, 140 is arranged to trigger a warning signal by the AVAS 170, 180 in case the airbag has been activated. This will generate an audible information message informing people in the vicinity of the vehicle that the vehicle has been involved in an accident.

The systems proposed herein may also be used for other, less critical, information tasks. For instance, the control unit may be configured to receive data associated with a load on one or more vehicle axles, wherein the vehicle control unit 130, 140 is arranged to trigger an information signal by the AVAS 170, 180 in case the load exceeds a pre-determined load threshold. This means that an operator outside of the vehicle, e.g., monitoring a loading operation, will receive an audible message from the AVAS when the load threshold has been breached. This will make it less likely that the vehicle is too heavily laden. Of course, more than one threshold can be configured, such as a desired load threshold indicating a desired load. The system can also be configured to monitor normal load on each side of the vehicle, and thus detect uneven load situations. The AVAS may then generate an audible warning signal informing the operator that the cargo is not evenly loaded on the vehicle.

According to further aspects, the vehicle control unit 130, 140 is arranged to receive data associated with a state of charge (SOC) of a battery system. The VCU 130, 140 may then be arranged to trigger an information signal by the AVAS 170, 180 in case the SOC exceeds a pre-determined SOC threshold. This way a person outside of, e.g., the cabin, will receive information about the current SOC, and in particular when charging has been completed.

There is also disclosed herein a warning system 130, 140, 170, 180 comprising a vehicle control unit 130, 140 as discussed above, and an AVAS connected to the vehicle control unit via the output port 203. Notably, the output port 203 and the various input ports may be realized as part if a shared communications bus, like a CAN bus or an Ethernet network onboard the vehicle unit or units.

According to aspects, the warning system 130, 140, 170, 180 comprises a redundant energy source 175, 185 arranged to at least temporarily power the AVAS 170, 180. This way the AVAS warning system can remain operational even if the main ESS subsystem goes off-line for some reasons, perhaps due to inactivation to stop a thermal event.

According to aspects, the warning system 130, 140, 170, 180 also comprises a redundant control unit with memory arranged to at least temporarily control the AVAS 170, 180 in case the connection between the AVAS 170, 180 and the vehicle control unit 130, 140 is lost. This control unit may keep the warning messages going, even if the main VCU has become inoperable for some reason.

Figure 3:
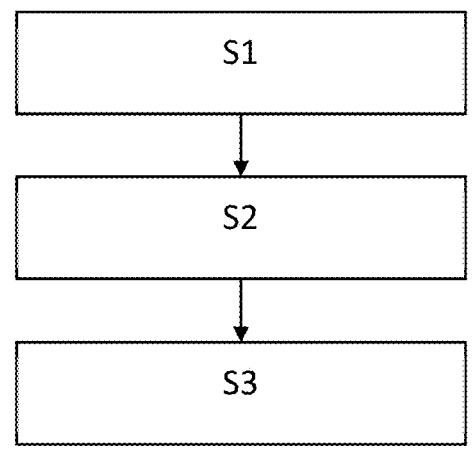
FIG. 3 is a flow chart illustrating methods.

FIG. 3 is a flow chart illustrating a method for generating a warning signal by a vehicle control unit 130, 140 arranged in an electrically powered vehicle unit 110, 120. The method comprises receiving S1 data, by the vehicle control unit 130, 140, wherein the data is associated with a status of one or more electrical system components 210, 220 of the vehicle unit 110, 120, detecting S2 onset of an electrical system fault condition based on the received data, and triggering S3 a warning signal by the AVAS 170, 180 in case an electrical system fault condition is detected.

Figure 4:
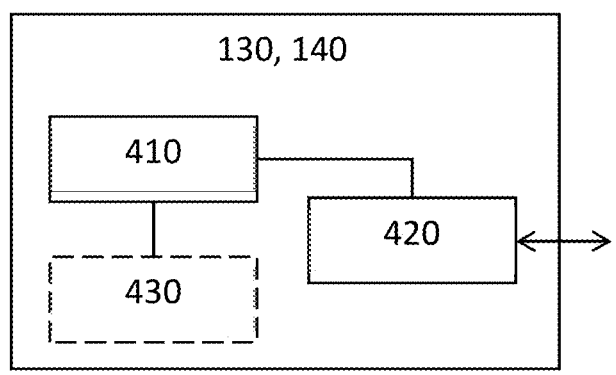
FIG. 4 schematically illustrates a control unit.

FIG. 4 schematically illustrates, in terms of a number of functional units, the components of a control unit 130, 140 according to embodiments of the discussions herein. This control unit may be comprised in the vehicle 100, e.g., in the form of a VCU. Processing circuitry 410 is provided using any combination of one or more of a suitable central processing unit CPU, multiprocessor, microcontroller, digital signal processor DSP, etc., capable of executing software instructions stored in a computer program product, e.g. in the form of a storage medium 430. The processing circuitry 410 may further be provided as at least one application specific integrated circuit ASIC, or field programmable gate array FPGA.

Particularly, the processing circuitry 410 is configured to cause the control unit 130, 140 to perform a set of operations, or steps, such as the methods discussed in connection to FIG. 3.

For example, the storage medium 430 may store the set of operations, and the processing circuitry 410 may be configured to retrieve the set of operations from the storage medium 430 to cause the control unit 130, 140 to perform the set of operations. The set of operations may be provided as a set of executable instructions. Thus, the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The control unit 130, 140 may further comprise an interface 420 for communications with at least one external device. As such the interface 420 may comprise one or more transmitters and receivers, comprising analogue and digital components and a suitable number of ports for wireline or wireless communication.

The processing circuitry 410 controls the general operation of the control unit 130, 140, e.g., by sending data and control signals to the interface 420 and the storage medium 430, by receiving data and reports from the interface 420, and by retrieving data and instructions from the storage medium 430. Other components, as well as the related functionality, of the control node are omitted in order not to obscure the concepts presented herein.

Figure 5:
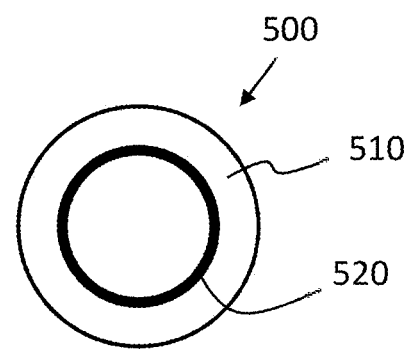
FIG. 5 shows an example computer program product.

FIG. 5 illustrates a computer readable medium 510 carrying a computer program comprising program code means 520 for performing the methods illustrated in FIG. 3, when said program product is run on a computer. The computer readable medium and the code means may together form a computer program product 500.

The invention claimed is:

1. A vehicle control unit for an electrically powered vehicle unit,
the vehicle control unit comprising at least one input port arranged to receive data associated with a status of one or more electrical system components, the vehicle control unit comprising an output port arranged to trigger a warning signal by an acoustic vehicle alerting system, AVAS, already present in the vehicle, wherein the vehicle control unit is arranged to detect onset of an electrical system fault condition based on the received data, and to trigger a warning signal by the AVAS in case an electrical system fault condition is detected, and is arranged to receive data associated with a load on one or more vehicle axles, and to trigger an information signal by the AVAS in case the load exceeds a pre-determined load threshold.

2. The vehicle control unit according to claim 1, wherein the received data comprises thermal data associated with a thermal status of an electrical system component, where the warning signal by the AVAS comprises a thermal event warning signal.

3. The vehicle control unit according to claim 1, wherein the received data comprises current measurement data associated with an operation of an electrical system component, where the warning signal by the AVAS comprises an electrical current warning signal.

4. The vehicle control unit according to claim 1, wherein the received data comprises voltage measurement data associated with an operation of an electrical system component, where the warning signal by the AVAS comprises an electrical voltage warning signal.

5. The vehicle control unit according to claim 1, wherein the vehicle control unit is arranged to detect onset of the electrical system fault condition and trigger the warning signal in response to an external control signal.

6. The vehicle control unit according to claim 1, further arranged to receive data associated with a status of an airbag system, wherein the vehicle control unit is arranged to trigger a warning signal by the AVAS in case the airbag has been activated.

7. The vehicle control unit according to claim 1, arranged to receive data associated with a state of charge, SOC, of a battery system, wherein the vehicle control unit is arranged to trigger an information signal by the AVAS in case the SOC exceeds a pre-determined SOC threshold.

8. The vehicle control unit according to claim 1, arranged in a tractor vehicle unit.

9. The vehicle control unit according to claim 1, arranged in a trailer vehicle unit.

10. A warning system comprising a vehicle control unit according to claim 1, and an AVAS connected to the vehicle control unit via the output port.

11. The warning system according to claim 10, comprising a redundant energy source arranged to at least temporarily power the AVAS.

12. The warning system according to claim 10, comprising a redundant control unit with memory arranged to at least temporarily control the AVAS in case the connection between the AVAS and the vehicle control unit is lost.

13. A heavy-duty vehicle or a heavy-duty vehicle unit comprising a warning system according to claim 10.

14. A method for generating a warning signal by a vehicle control unit arranged in an electrically powered vehicle unit, the method comprising
receiving data, by the vehicle control unit, wherein the data is associated with a status of one or more electrical system components of the vehicle unit,
detecting onset of an electrical system fault condition based on the received data, and triggering a warning signal by an acoustic vehicle alerting system, AVAS, already present in the vehicle, in case an electrical system fault condition is detected.

15. A vehicle control unit for an electrically powered vehicle unit,
the vehicle control unit comprising at least one input port arranged to receive data associated with a status of one or more electrical system components, the vehicle control unit comprising an output port arranged to trigger a warning signal by an acoustic vehicle alerting system, AVAS, already present in the vehicle, wherein the vehicle control unit is arranged to detect onset of an electrical system fault condition based on the received data, to trigger a warning signal by the AVAS in case an electrical system fault condition is detected, arranged in a tractor vehicle unit.

16. A vehicle control unit for an electrically powered vehicle unit,
the vehicle control unit comprising at least one input port arranged to receive data associated with a status of one or more electrical system components, the vehicle control unit comprising an output port arranged to trigger a warning signal by an acoustic vehicle alerting system, AVAS, already present in the vehicle, wherein the vehicle control unit is arranged to detect onset of an electrical system fault condition based on the received data, to trigger a warning signal by the AVAS in case an electrical system fault condition is detected, and arranged in a trailer vehicle unit.

* * * * *